United States Patent
Becherer et al.

(10) Patent No.: US 6,357,501 B1
(45) Date of Patent: Mar. 19, 2002

(54) VEHICLE WHEEL PROVIDED WITH A PNEUMATIC TIRE HAVING THEREIN A RUBBER MIXTURE PERMEATED WITH MAGNETIZABLE PARTICLES

(75) Inventors: Thomas Becherer, Hannover; Martin Fehrle, Köln; Klaus Kleinhoff, Rodenberg, all of (DE)

(73) Assignee: Continental Aktiengesellschaft (DE)

(*) Notice: Subject to any disclaimer, the term of this patent is extended or adjusted under 35 U.S.C. 154(b) by 0 days.

(21) Appl. No.: 09/189,120

(22) Filed: Nov. 9, 1998

Related U.S. Application Data

(63) Continuation-in-part of application No. 08/744,876, filed on Nov. 8, 1996, now Pat. No. 5,895,854.

(51) Int. Cl.[7] .......................... B29D 30/00; B29D 30/72; B60C 1/00; B60C 13/00
(52) U.S. Cl. ...................... 152/450; 73/146; 73/514.39; 152/525; 156/110.1; 156/123; 156/272.4; 156/379.6; 324/174; 701/70
(58) Field of Search .................................. 152/450, 525; 264/429, 437, 108; 156/110.1, 123, 272.4, 379.6; 324/173, 174; 303/DIG. 7, 166, 191; 188/1.11 E, 1.11 R; 340/441; 73/514.39, 146; 701/70; 702/148

(56) References Cited

U.S. PATENT DOCUMENTS

| | | | | |
|---|---|---|---|---|
| 3,225,810 A | * | 12/1965 | Enabnit | 152/450 X |
| 3,233,647 A | * | 2/1966 | Newell | 264/429 X |
| 3,750,120 A | * | 7/1973 | McCarty | 152/525 X |

* cited by examiner

Primary Examiner—Adrienne C. Johnstone
(74) Attorney, Agent, or Firm—R. W. Becker & Associates; R. W. Becker

(57) ABSTRACT

A pneumatic tire is provided that has a way to provide information. The pneumatic tire has at least at one predetermined location a rubber mixture that is permeated with magnetizable particles that are magnetized in a number of first zones and differently or not at all in a number of second zones. The tire can be used in a slip regulation system, and apparatus for producing such a tire are also provided.

32 Claims, 2 Drawing Sheets

VEHICLE WHEEL PROVIDED WITH A PNEUMATIC TIRE HAVING THEREIN A RUBBER MIXTURE PERMEATED WITH MAGNETIZABLE PARTICLES

CROSS REFERENCE TO RELATED APPLICATIONS

This application is a continuation in part patent application of application Ser. No. 08/744,876, filed Nov. 8, 1996, now U.S. Pat. No. 5,895,854.

BACKGROUND OF THE INVENTION

The present invention relates to a vehicle wheel that is provided with a pneumatic tire and that has means for providing information. Furthermore, the present invention relates to a method and apparatus for producing a tire for such a vehicle wheel.

The patents DE-195 03 468 and -9 disclose wheel bearing seal arrangements that have magnetizable elastomeric material and, to detect the rotation, are provided with a multi-pole ring that is disposed across from a sensor secured to the chassis.

EP 0 378 939 similarly describes a rotating seal having a magnetic coding as an indicator.

Aside from general shortcomings, such means for indicating the number of turns have the general drawback that they are not suitable for determining the information that is of interest for regulating slipping or sliding using the longitudinal forces that act upon the vehicle wheel.

In addition, the subject matter of the aforementioned documents are in principle not suitable for contributing any suggestion to the present invention.

The application PCT/EP95/03864 discloses a measuring system for detecting the longitudinal force of the tire and/or the tire deformation that is caused by the wheel load. The present invention is intended to serve in particular for the further development of this promising system.

SUMMARY OF THE INVENTION

It is an object of the present invention to provide a vehicle wheel that is provided with a pneumatic (rubber) tire, with the aid of which the information required for operating a modern vehicle, e.g. wheel rotational speed for ABS (anti-lock brake system) and/or longitudinal forces (torsional forces) that act upon the tire for regulating slipping, can be made available. In particular, a high level of security against vandalism and sabotage is to be achieved.

This object is realized in that the tire of the vehicle wheel, at least at one predetermined location, contains a rubber mixture that is permeated with magnetizable particles. These magnetizable locations, e.g. an annular band in the sidewall of the tire, should in the longitudinal or peripheral direction have successive zones of different, which includes zero, magnetization (e.g. bar codes) in one or more rows, wherein if two or more rows are provided, the rows are disposed at different radii along the peripheral direction of the tire. Thus with the aid of a sensor that is secured to the chassis, not only can the rotational speed and direction of rotation of the respective wheel be provided, but rather while additionally avoiding a reading row of the bar code that is disposed further radially inwardly, in place thereof or in addition thereto time intervals between the passive outer and inner marks can be measured, the lengths of which correlate with the desired information for longitudinal force and/or tire deflection.

In the magnetized zones, the magnetic lines of flux preferably extend in the peripheral direction. In this connection, a signal spacing is achieved by different orientation or alignment of the lines of flux (polarity).

A further object of the present invention is to provide a method and a related apparatus for producing an inventive tire.

The method essentially comprises introducing ferromagnetic particles into the rubber mixture, preferably in the vicinity of the sidewall of the tire, and magnetizing zones of such ferromagnetic particles in the peripheral direction of the tire with alternating polarity, or magnetizing some particle zones and not others. In either case, distinct differences will exist from zone to zone. The magnetization is preferably achieved by means of magnetic lines of flux that extend in the peripheral direction. The rubber mixture is, for example, in the form of an annular band obtained by either a straight extrusion or a straight calenderation aligning the magnetizable particles in the direction of extrusion or calenderation and by forming the straight band into the annular band.

The polarization, which varies over the periphery, preferably alternating, is preferably effected after installation of the band that contains the magnetizable particles into the green tire, and in addition preferably after vulcanization thereof. More preferably, the polarization is effected after the tire is delivered to a customer, and most preferably only shortly prior to mounting of the tire on a wheel, so that the signal sequence stored in the tire in at least one row on at least one sidewall of the tire can be set precisely to the requirements of a vehicle that is to be equipped with the tire.

The inventive method can be carried out with an apparatus that comprises field coils that are disposed in the peripheral direction of the tire and are embodied in the form of two half coils; the field or magnetizing coils can be disposed in the inner and outer sides of the tire at the location of the magnetizable regions, and can have supplied thereto electrical current. For this purpose, the two half coils are movably interconnected by electrical lines. So that a closed circuit is formed, an electrical connection exists between in each case two coils in which oppositely connected magnetic fields are built up, while axially extending magnetic lines of flux can be simply generated by conventional magnets, allowing the aforementioned apparatus to generate lines of flux that extend in the peripheral direction of the tire. The polarized zones produced in the tire then similarly have lines of flux that extend in the peripheral direction, as a result of which the signals can be detected particularly reliably and easily by sensors that are preferably arranged in such a way that they follow the spring movements of the wheel suspension and pivoting movements due steering.

If the physical arrangement is such that the lines that run back and forth between the two coils are physically closely adjacent between the two coils, especially preferably snaked together, the magnetic fields that are generated by the current in these connecting lines are nearly eliminated.

The apparatus can comprise a plurality of coil pairs. Complicated wiring between the coils is then also possible, but always reverts to the same principle.

Any sequence of differing magnetization may include some distance or space between consecutive zones of differing magnetization resulting in intermediate zones of zero magnetization. Thus, the wording "two zones are differently magnetized" includes the case where one of these zones is magnetized and the other is not magnetized.

To additionally recognize the direction of rotation of a tire, it is necessary to provide a pattern or sequence of differing magnetization which is asymmetrical along the peripheral direction. The object of such an asymmetry is that a different sequence is provided depending upon whether the zones of differing magnetization are read forward or backward. To accomplish this, it is necessary to provide three successive zones that are all different from one another.

For attaining a strong and cost-efficient magnetization, it is preferred to use anywhere only such pairs of coils explained before. Any pair of coils results in a part-sequence of polarization as NSSN or SNNS, wherein "S" is used for a south-pole and "N" for a northpole. For receiving—using such pairs of coils—not only two but three different zones of magnetization, there should be inserted anywhere between different coils or—preferably—between different pairs of coils a space of zero magnetization, addressed in the following by the symbol "0". Thus, such a direction-determining part of a sequence of polarization may be NOS or vice versa. The important thing is that the entire sequence must on the whole be asymmetrical so that it reads differently forward than backward.

Such a sequence may be: NSS<u>N0S</u>NNSSNNS,NSS<u>N0S</u>NNSSNNS,NSS<u>N0S</u>NNSSNNS, . . . In this example the direction-determining parts of the sequence are underligned. The inserted commas should only help to recognize the repeating periods; they do not represent a space of zero magnetization.

The shape of the coils can be adapted to the tire contour. One of the coil halves can be rigidly mounted.

Preferably after the vulcanization of the tire, the proposed apparatus serves for the inhomogeneous, in the peripheral direction of the tire, magnetization of hard magnetic particles that are previously introduced into a region of the tire sidewall. Hard magnetic particles are preferred over soft magnetic particles because the polarity thereof can be changed only with difficulty and therefore makes vandalism and sabotage more difficult. This involves the problem that in order to receive the desired magnetization, very strong magnetic fields are required; even these strong fields are made available by the aforementioned apparatus.

Such an alignment of the magnetization in the peripheral direction minimizes the diminishing of the magnetic polarization in the particles due to the field of the adjacent particles. A demagnetization would be particularly great for laminar magnets that are magnetized perpendicular to the surface, in other words with axial lines of flux.

If the connecting line between the coil pairs is flexible, the distance or spacing between the coils can be varied. This is of particular interest for the establishment of a bar code, and permits the formation of additional zones.

The apparatus is preferably embodied in such a way that it is possible to produce therewith a magnetic field that periodically varies in the peripheral direction so that regions with oppositely directed magnetization alternate with one another, or regions or zones of magnetization alternate or are separated from one another by zones or spaces of zero magnetization. The thus generated magnetization and the spatial magnetization differences can be detected with magnetic field sensors and can serve as input signals for slip regulating systems, especially also for SWT systems (sidewall torsion measuring systems).

The hard magnetic particles that are to be introduced into the tire preferably comprised hard ferrites and neodymium iron borides. In the magnetized state they have a maximum coercive field strength of about 10,000 A/cm. Such particles are preferably homogeneously distributed in the peripheral direction. In order to align the magnetic moments in these materials, magnetic fields of the order of magnitude of several Teslas are required. For this purpose, a winding turn density of 100/cm is required for a coil at, for example, a current intensity of 100 A. To achieve as great a field strength as possible in the outer space it is additionally necessary that the moments be aligned in the peripheral direction. In this case after all demagnetization effects ("magnetic short circuits") are particularly small. Demagnetization here means the self attenuation of a magnet due to its own magnetic field, which is particularly directed opposite to the "moments". The effect is a function of geometry and, for example for plates where the magnetization is perpendicular to the plane, is particularly great The term hard ferrites is used in this application to mean a hard ferromagnetic ferrite, and in particular an oxide ceramic material of the general formula $Me^{11}O.Fe_2O_3$, where $Me^{11}$ is a bivalent metal, such as barium, strontium, and iron, by way of example.

Soft magnetic materials, which in principle can have similar magnitude residual fields as do hard magnetic materials but have considerably smaller coercive field strengths, are less suitable for a tire that is to be used pursuant to the present invention. Although soft magnetic materials are easier to magnetize, they also lose their magnetization easier, for example in external magnetic fields or due to impacts. In addition, already with slight criminal energy they enable the manipulation of the magnetic code.

In order to be able to detect a change of the time span between the passes of the two marks (in one row for ABS or in two rows for SWT) as precisely as possible, it is desired that the magnetization in the peripheral direction be effected as quadrilaterally as possible, i.e. that the magnetization should be substantially homogeneous within a cohesive region (code bars), and above all at the boundaries of this region should change with as great a gradient as possible. For the conventional ABS systems that detect the wheel rotations it is, in contrast, sufficient if the magnetization in the peripheral direction of the tire be effected in a sinusoidal manner.

In principle, it would be simpler to magnetize the semi-finished product that is installed in the tire sidewall prior to build-up of the tire, and to install such magnetized pieces. With this method, there resulted at the respective abutment or contact areas irregularities in the magnetization and air pockets in the green tire. In addition, problems resulted due to the bulging process of the tire. At least one class of compounds having very high residual magnetism (neodymium iron borides) degrades starting at temperatures greater than about 120° C., i.e. the magnetization of particles of this material decreases irreversibly so that the tire vulcanization, which is frequently carried out at temperatures of between 160° C. to 200° C., stands in the way of the use of these materials.

For this reason, in the event that neodymium iron borides are to be used, the magnetization of the tire sidewall must be effected after the vulcanization.

Although other hard ferrites can be exposed to this temperature without degradation of the magnetic properties, a disorientation or disalignment of the particles in the rubber mixture can occur due to the flow processes, so that the macroscopic magnetization of a zone(region) decreases, although the magnetization of the particles is not affected. For this reason, even when using these other hard ferrites that are known to the expert the magnetization is preferably carried out after the vulcanization.

In contrast to the wheel bearing seals, pursuant to the present invention the magnetizable regions are disposed in the interior of the tire rubber, so that the minimum distance between the coil wires and the region that is to be magnetized is considerably greater. The field intensity generated by a coil is inversely proportional to the distance from the wire and is therefore reduced in the same proportion as the increase in the distance. The preferred length in the peripheral direction of a homogeneously magnetized region(pole) on the inventive tire is approximately as great as with the known wheel bearing seals and therefore, when the magnetization is effected at the end of the tire production process, produces a satisfactorily strong signal when it passes a sensor in relationship to the expended current intensity. In contrast thereto, merely multiplying the number of wires would lead to an extremely high consumption of energy accompanied by not having an optimum homogeneity of the magnetization within a pole.

Due to the high field intensity required for the magnetization, a correspondingly high number of ampere turns is required. For this reason, a coil-type arrangement is selected.

With the simplest approach of disposing two field or magnetizing coils on both sides of the tire sidewall, with the axes of the coils parallel to the peripheral direction, there is achieved in the region that is to be magnetized only a weak magnetic field in relation to the field intensity in the coils. To increase the strength it is therefore necessary to not return the current at a distance from the tire, but rather to dispose the wires in the vicinity of the tire so that the field becomes maximum in the tire sidewall.

An alternative approach for achieving as homogeneous a field in the peripheral direction as possible in the regions (poles) that are to be magnetized while at the same time not having to take into account great losses during the magnetization, is provided with an arrangement where the field that is generated by the connecting wires between the coils is compensated by an equal magnitude current that however flows in the opposite direction. This arrangement can also be combined with the aforementioned arrangement, e.g. only for the inner connecting wires.

BRIEF DESCRIPTION OF THE DRAWINGS

The subject matter of the present invention will be described in detail subsequently with the aid of the accompanying drawings.

DESCRIPTION OF PREFERRED EMBODIMENTS

Figure 1:
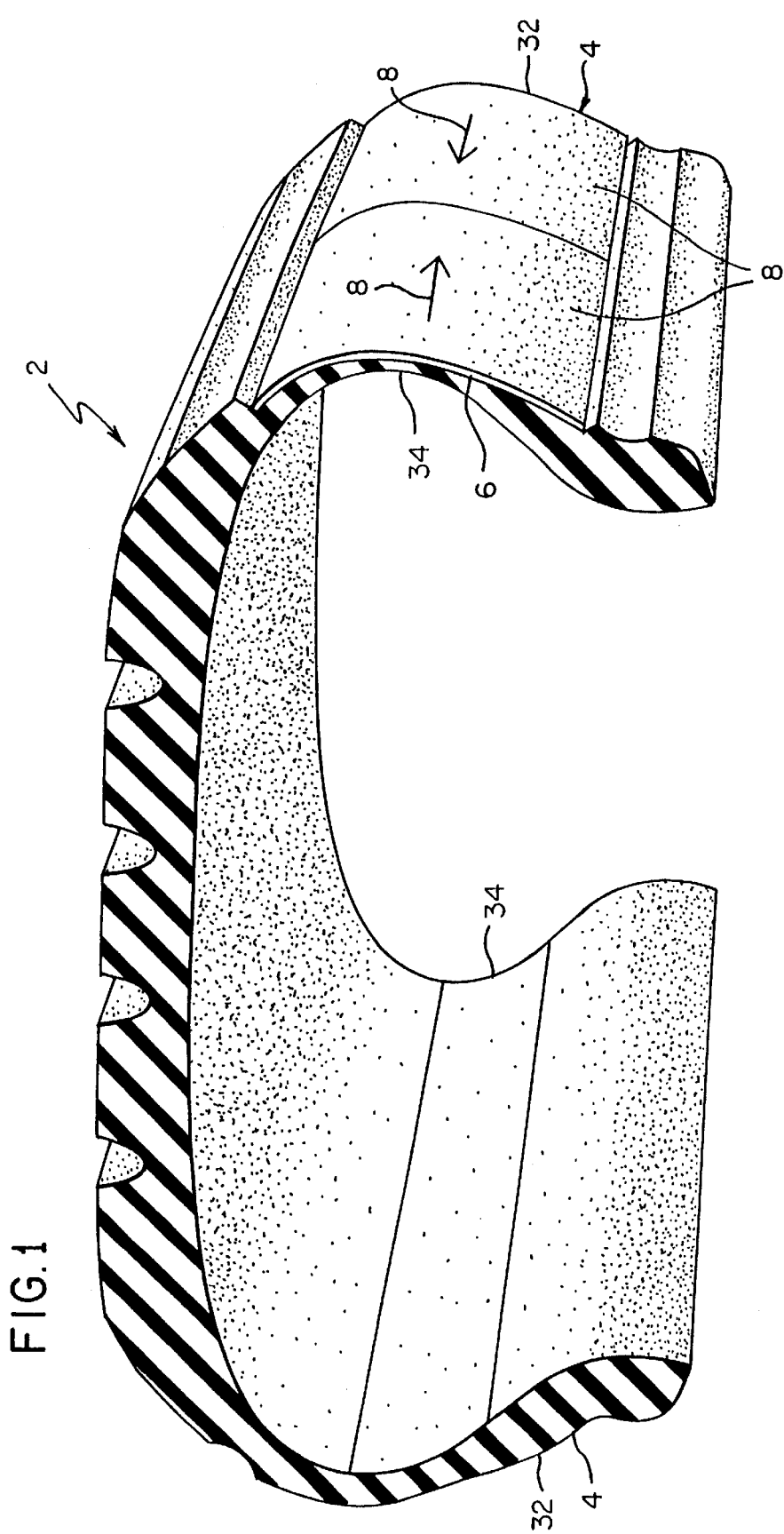
FIG. 1 is a perspective view of a portion of an inventive vehicle tire.

As can be seen from FIG. 1, the inventive vehicle tire 2 is provided on at least one of its sidewalls 4 with an insert or layer 6. This layer 6 is a rubber mixture to which has been added ferromagnetic particles. Such particles are preferably hard ferrites and/or neodymium iron boride that in the magnetized state can have a maximum coercive field intensity of $10^6$ A/m. This layer 6 of magnetizable rubber mixture is magnetized prior to or after vulcanization of the tire 2.

If magnetization is effected prior to vulcanization, care must be taken in the selection of the magnetizable particles so that the required temperature stability (170°) of the magnetization is ensured.

The magnetization is preferably carried out subsequent to vulcanization. Magnetization is effected in the direction of the rotation of the sidewall of the tire. In this connection, poles oriented in the longitudinal direction, and poles directed opposite one another, alternate with one another. In this way a kind of magnetic bar code is formed that for scanning purposes can be detected by means of a magnet sensor that is mounted to the side next to the rotating vehicle wheel, being secured either to the chassis or preferably to the wheel axle.

Figure 2:
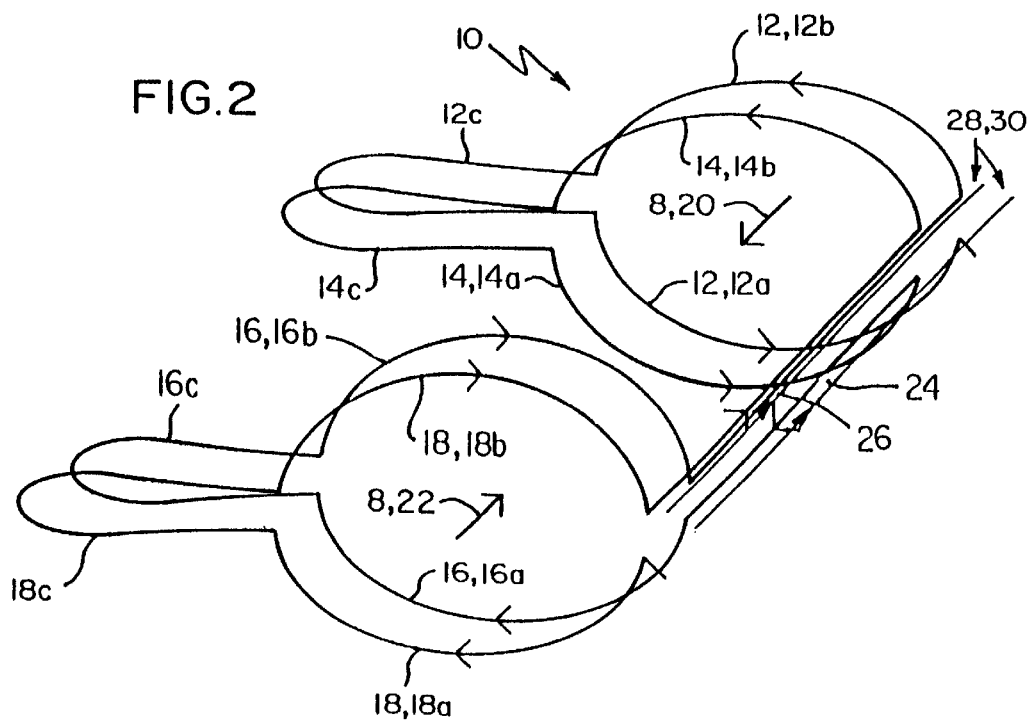
FIG. 2 illustrates the principle of coil arrangement that is the important inventive component of a magnetization apparatus.

The coil arrangement illustrated in FIG. 2 for magnetizing the ferromagnetic rubber mixture 6 found in the tire sidewall 4 comprises four coils 12, 14, 16, and 18, each of which comprises an "inner" coil half 12a, 14a, 16a, and 18a, and an "outer" half 12b, 14b, 16b and 18b. The "inner" coil halves 12a, 14a, 16a and 18a and the "outer" coil halves 12b, 14b, 16b and 18b are respectively interconnected by means of a flexible electrical line 12c, 14c, 16c and 18c. Two respective coils 12 and 14, or 16 and 18, i.e. in each case a coil pair, is electrically connected in the same direction so that each coil pair 12, 14 or 16, 18 generates a rectified magnetic field 20. The two coils 16, 18 of the second coil pair are connected in such a way that they generate a magnetic field 22 that is directed opposite to that of the first coil pair 12, 14.

Electrical connections 24, 26 between the two coil pairs 12, 14 and 16, 18 are respectively provided with a compensation line 28, 30 for the compensation of the magnetic fields of the connecting lines 24, 26. Since the electrical connections 12c, 14c, 16c and 18c between the respective "inner" coil halves 12a, 14a, 16a and 18a and the "outer" coil halves 12b, 14b, 16b and 18b are flexible, the "inner" coil halves 12a, 14a, 16a and 18a can be slipped over the outer side 32 of the sidewall 4, and the "outer" coil halves 12b, 14b, 16b and 18b can be slipped over the inner side 34 of the sidewall 4 of the most different types of tire 2 without difficulty.

Figure 3:
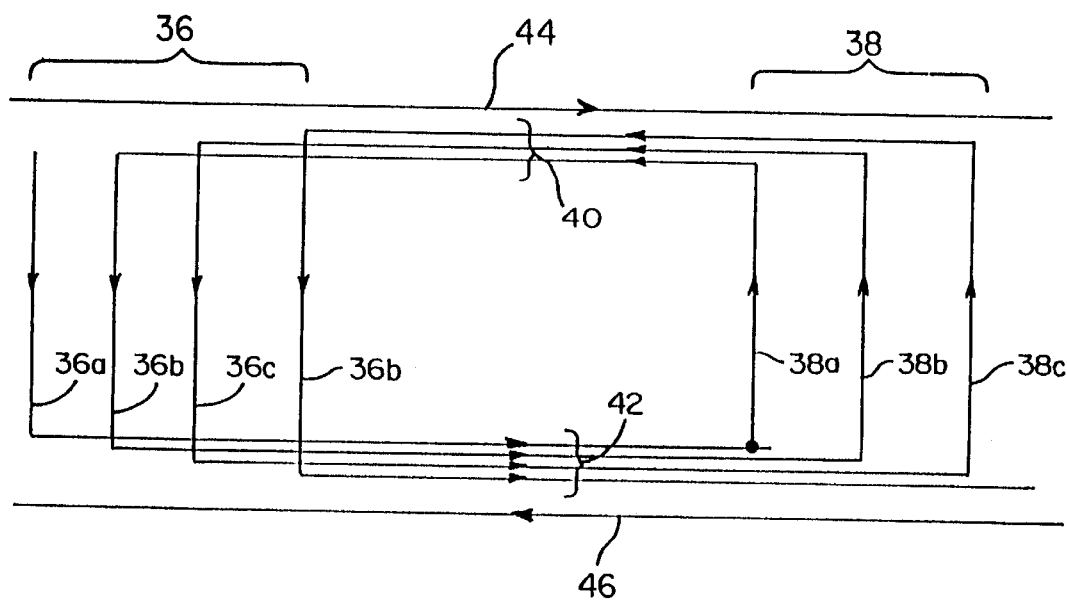
FIG. 3 illustrates the principle of an alternative current guidance.

The embodiment of the electrical conductor arrangement illustrated in FIG. 3 comprises a region 36 of parallel lines 36a, 36b, . . . having the same direction of current, with this region alternating with a region 38 of lines having the opposite direction of current.

The connecting line 40, 42 between the individual lines 36a, 36b, . . . or 38a, 38b, . . . of the line regions and of the overall line arrangement respectively contains a compensation wire 44, 46. This compensation wire 44 or 46 effects a compensation of the magnetic field generated by the connecting line 40 or 42, so that exclusively the wires 36a, 36b . . . and 38a, 38b . . . , for generation of the main field generate an effective magnetic field. If this alternative wire arrangement is disposed on the sidewall 4 of the tire 2 that is to be magnetized, there results in the magnetizable rubber mixture 6, in the longitudinal direction of the tire sidewall 4, magnet poles 8 having a polarity that is opposed to one another (see FIG. 1).

The specification incorporates by reference the disclosure of German priority document 196 46 251.7 of Nov. 8, 1996.

The present invention is, of course, in no way restricted to the specific disclosure of the specification and drawings, but also encompasses any modifications within the scope of the appended claims.

What we claim is:

1. A pneumatic tire having means for generating information during tire operation, wherein at least at one predetermined location said tire contains a rubber mixture that is permeated with magnetizable particles, wherein said magnetizable particles are magnetized in a number of first zones, and wherein in a number of second zones said magnetizable particles are either not magnetized or are magnetized in a different manner than in said first zones, wherein in all magnetized zones lines of magnetic flux extend in a peripheral direction of said tire.

2. A pneumatic tire according to claim 1, wherein said magnetizable particles are anisotropically aligned essentially in the peripheral direction of said tire.

3. A pneumatic tire according to claim 2, wherein magnetization in a given one of said first and second zones is substantially homogeneous, and wherein at boundaries of said first and second zones distinct gradients of magnetization exist.

4. A pneumatic tire according to claim 3, wherein adjacent ones of said first and second zones have an opposite orientation of said magnetic lines of flux and flux line components, consequently having an opposing pole sequence N,N,S,S,N,N,S,S, and so forth.

5. A pneumatic tire according to claim 1, wherein said magnetizable particles have a zero magnetization in at least one of said second zones.

6. A pneumatic tire according to claim 1, wherein said first zones and said second zones are arranged in at least one row.

7. A pneumatic tire according to claim 6, wherein two or more rows of said first and second zones are provided, each row being disposed at a different radius along a peripheral direction of the tire.

8. A pneumatic tire according to claim 6, wherein in at least one of said at least one row said zones comprise a differing magnetization including partial sequences of SNNS or NSSN.

9. A pneumatic tire according to claim 8, wherein between at least two of said partial sequences there remains a space or distance without magnetization.

10. A pneumatic tire according to claim 6, wherein in at least one of said at least one row said zones comprise a differing magnetization including partial sequences of NSSN as well as SNNS.

11. A pneumatic tire according to claim 10, wherein between at least two of said different partial sequences there remains a space or distance without magnetization.

12. A pneumatic tire according to claim 1, wherein lines of magnetic flux extend in an opposite orientation in said second zones than in said first zones.

13. A pneumatic tire according to claim 1, wherein differently magnetized zones periodically follow one another in a plurality of rows, wherein each row is disposed at a different radius along said peripheral direction of said tire.

14. A pneumatic tire according to claim 1, wherein said first and second zones are magnetized in a differing manner, and wherein in a number of third zones said magnetizable particles are not magnetized.

15. A pneumatic tire according to claim 1, wherein in a number of third zones, said magnetizable particles are magnetized in a different manner than in said first and second zones.

16. A pneumatic tire according to claim 1, wherein said first and second zones are magnetized in a differing manner, and wherein in a number of third zones said magnetizable particles are not magnetized or are magnetized in a different manner than in said first and second zones, and wherein said first, second and third zones are arranged in an asymmetrical sequence such that said sequence is different when read forward than when read backward.

17. A pneumatic tire according to claim 1, wherein said rubber mixture is in the form of an annular band obtained by a plastic deformation that aligns said magnetizable particles in the direction of plastic deformation and by forming said deformed rubber mixture into said annular band.

18. A pneumatic tire according to claim 17, wherein said rubber mixture is in the form of an annular band obtained by a straight extrusion aligning said magnetizable particles in the direction of extrusion and by forming said extruded straight band into said annular band.

19. A pneumatic tire according to claim 17, wherein said rubber mixture is in the form of an annular band obtained by a straight calenderation aligning said magnetizable particles in the direction of calenderation and by forming said calendered straight band into said annular band.

20. A pneumatic tire according to claim 1, wherein said magnetizable particles are hard magnetic.

21. In combination a pneumatic tire having means for generating information during tire operation and an apparatus providing lines of magnetic flux in the peripheral direction of the pneumatic tire, wherein at least at one predetermined location said tire contains a rubber mixture that is permeated with magnetizable particles, wherein said magnetizable particles are magnetized in a number of first zones, and wherein in a number of second zones said magnetizable particles are either not magnetized or are magnetized in a different manner than in said first zones, wherein in all magnetized zones lines of magnetic flux extend in a peripheral direction of said tire, said apparatus comprising:

pairs of two coils each with windings, wherein each coil has an inner coil half, with half windings, disposed against an axially inner part of said tire, and an outer coil half, disposed against an axially outer part of said tire; and respective electrical lines interconnecting said inner and outer coil halves of each of said coils, wherein all windings of a given coil are electrically connected in the same direction so that each coil generates a rectified magnetic field, and wherein said windings are connected in such a way that the coils of a first coil pair generate a magnetic field that is opposite or inverse to that generated by a second coil pair if each coil pair is electrically connected.

22. An apparatus and pneumatic tire combination according to claim 21, which includes further electrical connecting lines disposed between said coil pairs, wherein each of said further electrical connecting lines is provided with a compensation line compensating for the magnetic field generated by that connecting line.

23. An apparatus and pneumatic tire combination according to claim 21, wherein a space of zero magnetization is provided between at least two of said pairs of coils.

24. An apparatus and pneumatic tire combination according to claim 23, wherein consecutive pairs of coils between which a space of zero magnetization is provided are different, resulting in a part-sequence of polarization as NSSN0SNNS or, inversely, SNNS0NSSN.

25. An apparatus and pneumatic tire combination according to claim 24, wherein the complete sequence of polarization contains part-sequences of either NSSN0SNNS or SNNS0NSSN, resulting in an asymmetry.

26. An apparatus and pneumatic tire combination according to claim 21, wherein the complete sequence of polarization contains part-sequences including a space of zero magnetization characterized in that inverse part-sequences are avoided in the complete sequence, resulting in an asymmetry.

27. In combination, a pneumatic tire having means for generating information during tire operation and an apparatus providing lines of magnetic flux in the peripheral direction of the pneumatic tire, wherein at least at one predetermined location said tire contains a rubber mixture that is permeated with magnetizable particles, wherein said magnetizable particles are magnetized in a number of first zones and wherein in a number of second zones said magnetizable particles are either not magnetized or are magnetized in a different manner than in said first zones, wherein in all magnetized zones lines of magnetic flux extend in a peripheral direction of said tire, said apparatus comprising:

an arrangement of electrical lines disposed against said rubber mixture that is permeated with magnetizable particles, said arrangement including at least one first region of parallel electrical lines having the same current relative to one another, and at least one second region of parallel electrical lines having the same current relative to one another, wherein the current direction of said electrical lines of said at least one second region is zero or opposite to that of said electrical lines of said at least one first region so as to be different therefrom, said first and second regions of different current alternating with one another over a peripheral direction of said apparatus;

connecting lines effecting connection between individual ones of said electrical lines of said first and second regions and of said overall arrangement of electrical lines; and a respective compensation wire compensating for the magnetic field generated by each of said connecting lines.

28. An apparatus and pneumatic tire combination according to claim 27, which includes a plurality of first regions of parallel electrical lines, and a plurality of second regions of parallel electrical lines.

29. An apparatus and pneumatic tire combination according to claim 27, wherein a space of zero magnetization is provided between at least two of said regions of parallel electrical lines.

30. An apparatus and pneumatic tire combination according to claim 29, wherein consecutive regions of parallel electrical lines between which a space of zero magnetization is provided are different, resulting in a part-sequence of polarization as NSSN0SNNS or, inversely, SNNS0NSSN.

31. An apparatus and pneumatic tire combination according to claim 30, wherein the complete sequence of polarization contains part-sequences of either NSSN0SNNS or SNNS0NSSN, resulting in an asymmetry.

32. An apparatus and pneumatic tire combination according to claim 27, wherein the complete sequence of polarization contains part-sequence including a space of zero magnetization characterized in that inverse part-sequence are avoided in the complete sequence, resulting in an asymmetry.

* * * * *